Figure 1:
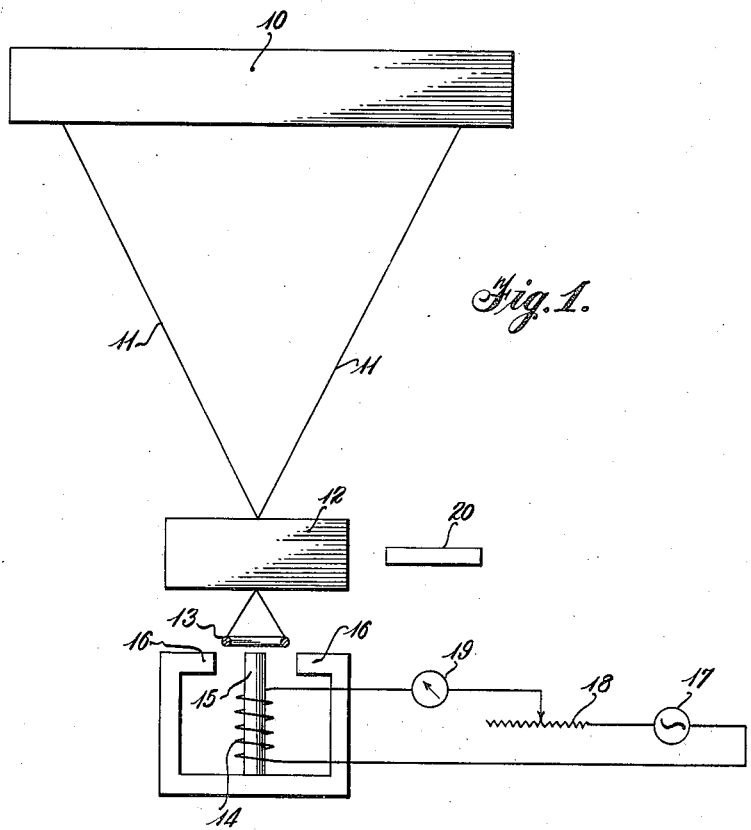

May 27, 1941.　　　D. H. CLEWELL　　　2,243,748
GRAVITY METER
Filed Feb. 21, 1940

Inventor
*Dayton H. Clewell*

By *Dallas R. Lamont*
Attorney

Patented May 27, 1941

2,243,748

UNITED STATES PATENT OFFICE 2,243,748

GRAVITY METER

Dayton H. Clewell, Dallas, Tex., assignor, by mesne assignments, to Socony-Vacuum Oil Company, Incorporated, New York, N. Y., a corporation of New York Application February 21, 1940, Serial No. 320,055

4 Claims. (Cl. 265—1.4)

This invention relates to a method of and means for performing geophysical explorations by measuring the relative gravitational forces which the earth exerts at various locations. More particularly, this invention relates to a particular method and means whereby a resiliently supported mass may be brought to the same position relative to the support regardless of small differences in gravitational attraction occasioned by changes in the location of the instrument, and the force required to bring the mass to the same relative position may be measured as a measure of the difference in gravitational attraction.

Prior to this invention a large number of gravity meters of various types have been proposed and many have gone into actual use. Most of these have consisted of resiliently supported masses and arrangements for noting the position of the mass relative to the support so that any change in its position due to a change in the gravitational force affecting it could be noted. In a general way these devices may be considered to be refinements of the commonly used spring balance. Obviously, however, the refinements have been highly complicated since it is necessary to make the device far more sensitive and compensate for or exclude errors due to temperature changes, fatigue in materials, stretching of supporting wires, and the like.

In addition to these complicated factors, which make accurate determination of gravity difficult, but not impossible, it has also been found that when a mass is supported by an elastic or resilient supporting means, and the mass then goes upward or downward, due to a change in the gravitational pull upon it, the reaction of the resilient supporting means on the mass changes not in a simple ratio to the movement of the mass but in a complicated way that is quite difficult to determine or compute. This is due, at least in part, to the fact that the supporting means is nearly always used under peculiar conditions to make it unusually sensitive to small changes in gravitational force. Therefore, when a measurement is made at one locality and a zero or base point established for the position of the mass, and the instrument is subsequently moved to another locality where it is found that the mass comes to rest in a different position, it is usually almost impossible to ascertain or compute the actual difference in the gravitational force which causes the displacement.

Attempts have already been made to avoid this difficulty by bringing the mass back to a fixed position at each location and measuring the amount of force necessary to bring the mass back to that position. This avoids the necessity of having to calculate the amount of force that causes a certain deflection of a complicated resilient support for a gravity meter mass. Difficulty has been encountered, however, in finding a way to apply force to a gravity meter mass in such a way that the force can be small enough to balance the gravitational difference and yet can be measured. Attempts to accomplish the results electromagnetically have not been entirely satisfactory, partly because of the extremly small forces that it is desired to apply and the fact that the current necessary to apply such a force must necessarily be so small as to make measurement extremely difficult.

Confronted with this situation, the present inventor has discovered that by the use of the eddy current phenomena he may use a relatively large current to apply to the gravity meter mass an extremely small force, which force is directly related to the amount of current used, and which for that reason may be determined by determining the amount of current used to produce it.

This invention may be embodied in any gravity meter of the types already known in which a mass is suspended resiliently from a support and a means is provided to observe the position of the mass. For example, from the mass of such a gravity meter, a small ring of conductive material such as copper or aluminum may be supported, and around this ring may be positioned any desired means to create a variable and alternating magnetic field. For example, one pole of an electromagnet may be placed inside of the ring and a pair of oposing poles may be placed symmetrically outside of the ring. When the field coils of the magnet are supplied with alternating current there will be a tendency to move the conducting ring which in turn tends to move the mass of the gravity meter. The amount of force applied to the gravity meter mass through the ring, is extremely small as compared with the amount of current passing through the field coils of the electromagnet, yet it is proportional so that a measurement of the amount of the current in the field coils of the electromagnet can be easily converted into a measurement of the amount of force necessary to return the gravity meter mass to an arbitrary zero or base position.

Figure 2:
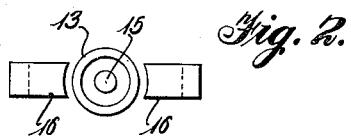

In order to more fully understand the details and advantages of the present invention, reference may be had to the drawing, in which Figure 1 is a diagrammatic illustration of the essential parts of a gravity meter embodying the present invention; and Figure 2 is a detailed view showing the manner in which the conducting ring fits into the electromagnet.

It will at once be apparent to those skilled in the art that many modifications in the structural details of the illustrated device may be made without departing from the spirit of the invention. For example, any other desired type of support for the gravity meter mass may be used, a conductive disk may replace the conducting ring shown, and the electromagnet may take any one of a number of forms. The device of the drawing is shown merely for the purpose of illustrating the principles here involved and because it is one form of the invention that is known to have particular advantages, but the scope of the invention is not limited thereto.

The preferred embodiment of the invention shown in the drawing uses a type of gravity meter containing a support 10, resilient torsion elements 11 and a suspended mass 12. In the operation of this gravity meter a torsional stress is applied to the resilient elements in such a manner that the system is in a delicately balanced state and as a result the suspended mass is very sensitive to small changes in the gravitational forces acting upon it. Any change in the gravitational force causes the suspended mass to be displaced in a vertical direction and imparts to the mass a rotary screw action either up or down depending on whether the gravitational force increases or decreases.

According to the invention the change in downward force exerted by the gravity meter mass is measured by applying a balancing force to the mass which counteracts any change in the gravitational attraction and the magnitude of the force required to return the mass to or keep the mass in its original position is an exact measure of the change in the gravitational force. In the preferred embodiment this is accomplished by suspending from the gravity meter mass a copper ring 13 in such a manner that its axis is at right angles to the axis of the mass. This copper ring is disposed in a magnetic field which in this case is produced by an electromagnet. The magnetic field is induced by an alternating current flowing through the windings of the core 14 which forms the central pole piece 15 of the magnet. Integral with this core are two arms forming the opposing pole faces 16 which are diametrically opposite the pole piece 15. This electromagnet is positioned in such a manner that the central pole piece 15 extends into or nearly into the center of the copper ring 13 and the opposing pole faces 16 are placed symmetrically outside of the ring as shown in Figure 2. The alternating current applies to the winding of the core 14 is supplied by an alternating current generator 17 through a variable resistance 18 and an ammeter 19.

When the magnet is energized the alternating current sent through the winding produces rapid reversals in the magnetism of the core 14 which in turn sets up induction currents or eddy currents in the copper ring 13. These currents are generated in planes perpendicular to the direction of the magnetic flux across the pole faces and travel first in one direction and then another, alternating with the phase of the exciting current. In each direction the magnetic field which these eddy currents create opposes the change that is occurring and results in a force tending to drive the ring upward. The magnitude of this force is proportional to the amount of current applied to the magnet and is controlled by the operation of the variable resistance 18 and measured by the ammeter 19.

The position of the gravity meter mass is observed by a viewer or hair line telescope 20 which is focused on a fiduciary mark or scale on the mass itself.

In operation a series of locations or stations are selected and one location used as the base point for all readings. The instrument is then brought into position at this base station and the electromagnet energized. The position of the mass is observed through the telescope 20 and the fiduciary mark of the mass brought into the hair line of the telescope by increasing or decreasing the amount of current applied to the magnet, depending on the direction of the displacement of the mass.

The amount of current necessary to bring the system to a balance point is determined from the ammeter 19 and used as the zero or base point for the other readings. After the meter has been balanced at the base station, it is moved to the other predetermined locations and the process is repeated, e. g. balancing the system with respect to the fiduciary mark of the gravity meter mass by altering the current flowing through the winding of the core so that a sufficient force is applied to the copper ring to bring the mass back to its zero position. The difference between the final ammeter reading at each station is compared with the base reading from the base station and the corresponding forces applied to the mass through the copper ring computed.

These calculated forces are the forces necessary to overcome the changes in gravitational attraction from the base station to each of the other stations and are therefore an indication of the relative magnitude of the gravitational force at each location.

I claim:
1. A device for geophysical prospecting that comprises a support, a mass resiliently suspended from said support, means for noting the relative positions of the mass and support, and a non-magnetic electro-conductive member fixed to said mass, means to generate an alternating magnetic field including said conducting member, and means to measure the strength of said field.

2. A device for geophysical prospecting that comprises a support, a mass resiliently suspended from said support, means for noting the relative positions of the mass and support, a non-magnetic electro-conductive ring member suspended from said mass, means to generate an alternating magnetic field including said conducting member, and means to measure the strength of said field.

3. A device for geophysical prospecting that comprises a support, a mass resiliently suspended from said support, means for noting the relative positions of the mass and support, a conductive ring suspended from said mass, an electro-magnet disposed directly below and concentric with said conductive ring, means for inducing an alternating magnetic field into said electro-magnet and means to measure the strength of said magnetic field.

4. A device for geophysical prospecting that comprises a support, a mass resiliently suspended from said support, means for noting the relative positions of the mass and support, a non-magnetic electro-conductive member fixed to said mass, means for generating eddy currents in said member which react against said generating means to develop a force that will displace the mass relative to the support and means for measuring a parameter that is proportional to said force.

DAYTON H. CLEWELL.